(12) United States Patent
Henry et al.

(10) Patent No.: US 7,730,241 B2
(45) Date of Patent: Jun. 1, 2010

(54) DEVICE AND CONFIGURATION METHOD

(75) Inventors: Steven G. Henry, Ft. Collins, CO (US); Rick R. Rothwell, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 166 days.

(21) Appl. No.: 11/788,656

(22) Filed: Apr. 20, 2007

(65) Prior Publication Data

US 2008/0263231 A1  Oct. 23, 2008

(51) Int. Cl.
*G06F 3/00* (2006.01)
*G06F 13/12* (2006.01)
*G06F 15/177* (2006.01)

(52) U.S. Cl. .................. 710/62; 710/8; 710/10; 710/63; 709/220

(58) Field of Classification Search .................. 710/62, 710/63, 8, 10; 709/220
See application file for complete search history.

(56) References Cited

U.S. PATENT DOCUMENTS

| 2003/0195952 | A1 | 10/2003 | Henry et al. |
| 2003/0200234 | A1* | 10/2003 | Koppich et al. ............. 707/203 |
| 2004/0267971 | A1* | 12/2004 | Seshadri ........................ 710/8 |
| 2006/0044606 | A1* | 3/2006 | Yamamura ................. 358/1.15 |
| 2008/0016331 | A1* | 1/2008 | Yeung et al. .................... 713/1 |
| 2008/0215454 | A1* | 9/2008 | Haines et al. ................. 705/26 |

\* cited by examiner

*Primary Examiner*—Niketa I Patel

(57) ABSTRACT

A process for configuring a computing device to operate with a peripheral device having a configuration control and that is coupled to the computing device via a network, including: detecting activation of the configuration control at the peripheral device; receiving information associated with a user of the computing device at the peripheral device; outputting information from the peripheral device dependent on the received information; and configuring the computing device to operate with the peripheral device using the outputted information.

26 Claims, 11 Drawing Sheets

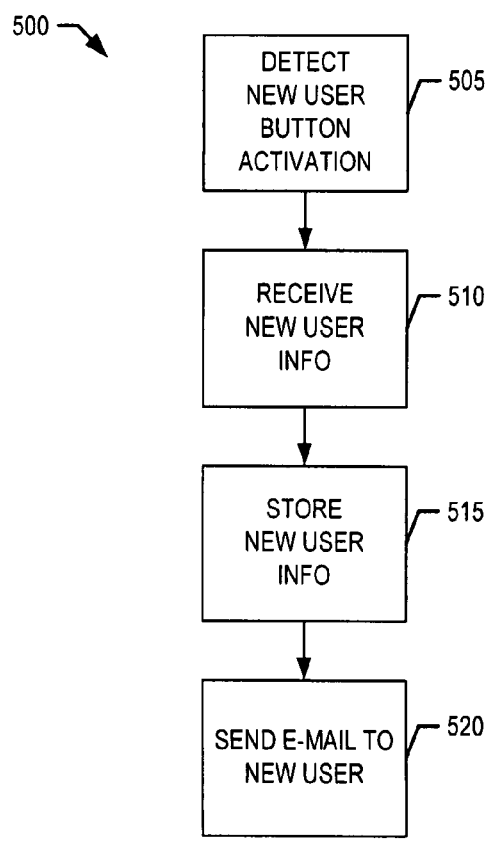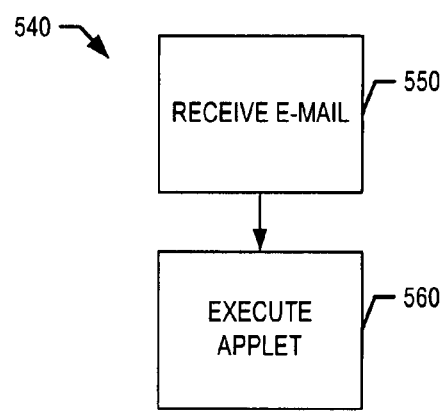
Fig. 5a
Fig. 5b

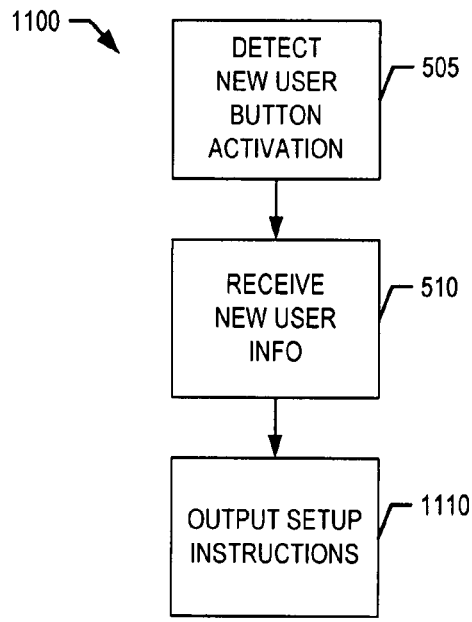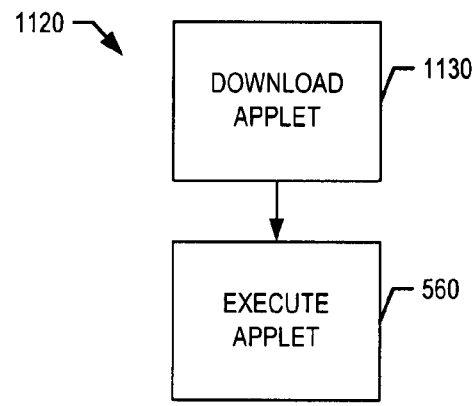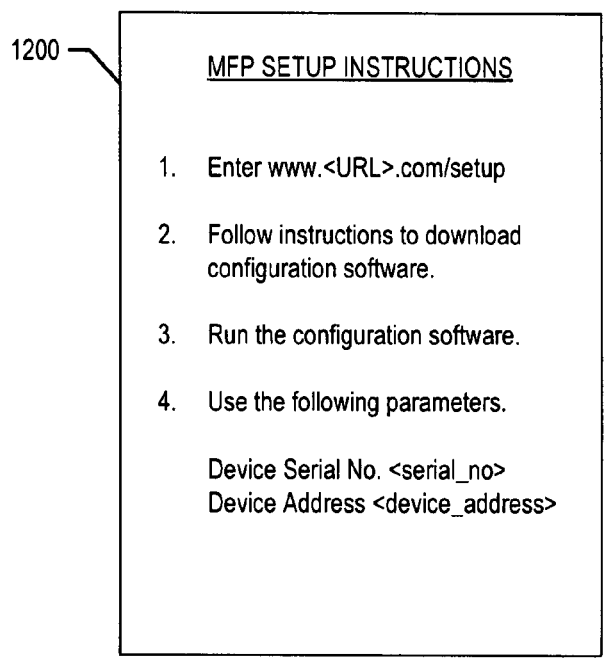

DEVICE AND CONFIGURATION METHOD

FIELD OF THE INVENTION

The present invention relates generally to configuring computing devices.

BACKGROUND OF THE INVENTION

Non-limiting examples of peripheral devices are printers, scanners and other sources of digital data. Another example of a peripheral device suitable for use with computing devices is a multi-function peripheral device (MFP), such as an "all-in-one" device. A typical "all in one" device is a printer/scanner/copier, that has the capability to perform the multiple functions of printing documents, scanning hardcopy documents and copying hardcopy documents. Such a device may include facsimile functionality, as well. Another example of an MFP is a network ready digital copier—that scans in hard copy documents, does high volume copying, and can bind, collate, fold, stack, staple, stitch, edge-trim, paginate, and/or print on substrates of varied composition, for example. The present invention will be further discussed as it relates to MFPs, for non-limiting purposes of explanation only.

An MFP may typically be connected to computer devices over an interconnecting network. In such a configuration, the MFP must be configured for use with both the network and computing devices. There are several methods of configuring an MFP. One method is to use a web browser at a computing device also connected to the interconnecting network, to manually configure the MFP. In such a case, the MFP is typically executing an embedded web server application. Another configuration method for particular network types is known as Active Directory, which is a service that allows one to configure the MFP with information as to other resources that are in communication with the interconnecting network. A still further configuration method is operating a software program that searches the interconnecting network to discover MFP devices on the interconnecting network, and then presents an administrator with a variety of preset configuration options.

In each of these configuration methods, a network administrator is typically needed. Administrator intervention can prove inconvenient or costly to the network owner when additional users, MFPs, and/or MFP functionalities are to be added. Alternative methods and devices that can reduce network administrator implemented tasks, and facilitate end users operating MFPs, are desirable.

SUMMARY OF THE INVENTION

A process for configuring a computing device to operate with a peripheral device having a configuration control and that is coupled to the computing device via a network, including: detecting activation of the configuration control at the peripheral device; receiving information associated with a user of the computing device at the peripheral device; outputting information from the peripheral device dependent on the received information; and configuring the computing device to operate with the peripheral device using the outputted information.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and:

FIGS. 5a and 5b illustrate processes according to an embodiment of the present invention;

FIGS. 11a and 11b illustrate processes according to an embodiment of the present invention;

FIG. 12 illustrates a series of instructions that may be provided according to an embodiment of the present invention;

DETAILED DESCRIPTION OF THE PREFERRED EMBODIMENTS

The following description of the preferred embodiments is merely by way of example and is in no way intended to limit the invention, its application, or uses.

Figure 1:
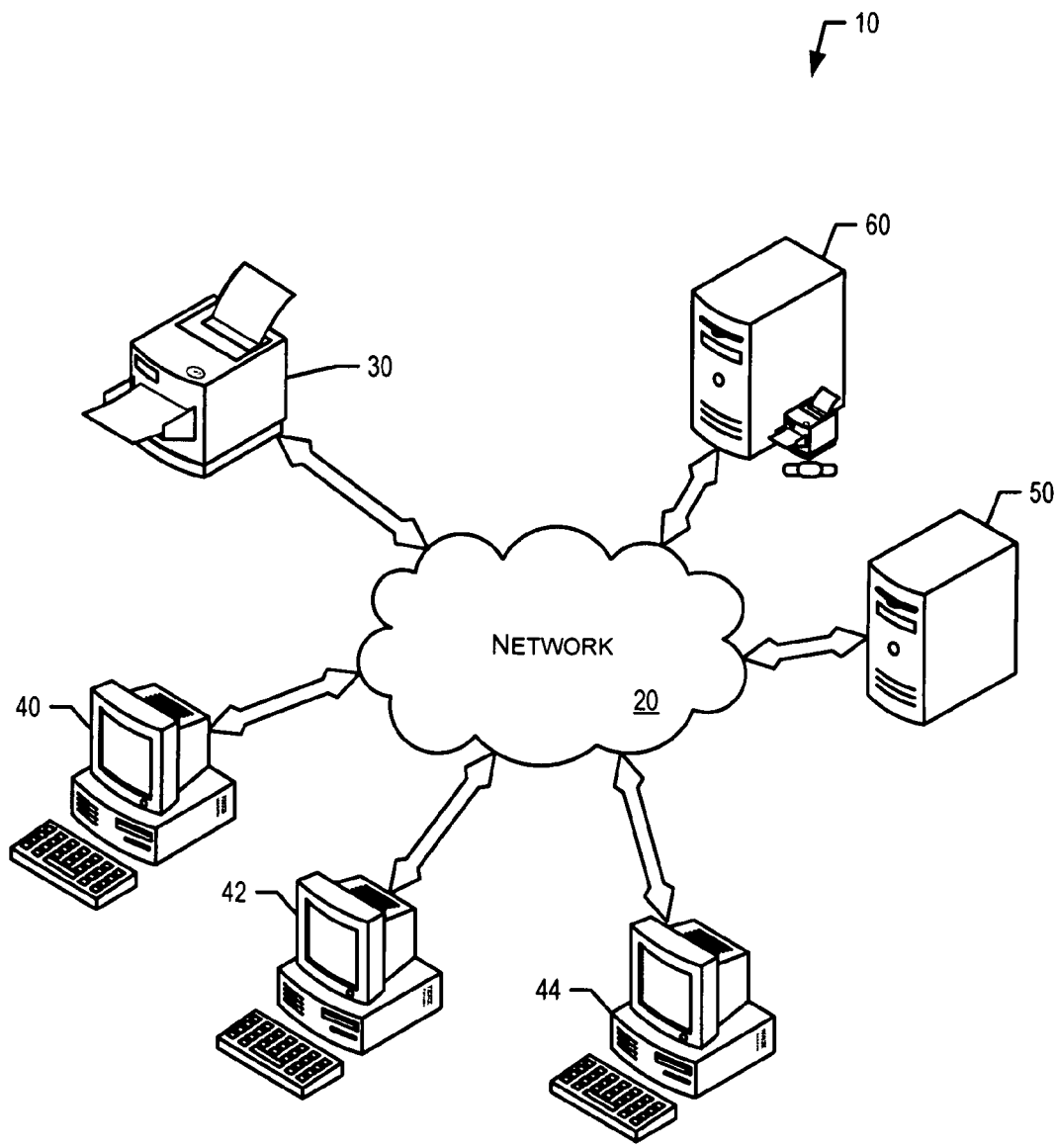
FIG. 1 illustrates a network including computing devices, a peripheral device and server devices.

FIG. 1 shows a representation of a system 10 in accordance with an embodiment of the present invention. System 10 generally includes an MFP 30, computing devices 40, 42, 44 and servers 50, 60 operatively interconnected with one-another via a computer network 20. The illustrated embodiment of FIG. 1 shows three computing devices, two servers, one MFP and a single network, for purposes of explanation only. In practicing embodiments of the present invention, different combinations of such elements may be used.

"Computer network", as used herein, generally refers to one or more mediums communicatively coupling two or more computing and/or peripheral devices (such as 30, 40, 42, 44, 50, or 60) together. There are many types of computer networks, including: local-area networks (LANs), wide-area networks (WANs), campus-area networks (CANs), metropolitan-area networks MANs), home-area networks (HANs) and the global interconnection of computer networks and computing devices commonly referred to as the Internet. Computer networks may typically incorporate wired and/or wireless links, switches and/or routers, for example.

"Computing device", as referred to herein, generally refers to a general purpose computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only. Memory may take the form of internal or external disc drives, for example. Memory may be internal or external to an integrated unit including a processor. Memory preferably stores a computer program or code, e.g., a sequence of instructions being operable by a processor. The embodiment of FIG. 1 shows three computing devices 40, 42, 44 in the form of conventional desktop personal computers. Other types of computing devices capable of utilizing and/or being utilized by MFP 30 may be used. Non-limiting examples of other suitable computing devices include portable personal computers, tablet computers, personal digital assistants (PDAs) and sophisticated digital cellular telephones.

"Server", as used herein, generally refers to a computing device communicatively coupled to a network that manages network resources. A server may refer to a discrete computing device, or may refer to the program that is managing resources rather than the entire computing device. For example, a network server manages network traffic, a file server manages files, a mail server manages electronic messages (e.g., queues and/or delivers e-mail messages), a database server manages one or more databases and provides results to queries; and, a print server manages one or more printing devices. In the illustrated embodiment of FIG. 1, server 50 takes the form of a network server, and server 60 takes the form of a print server. Server 50 may also incorporate a mail server and/or file server and/or database server.

Figure 2:
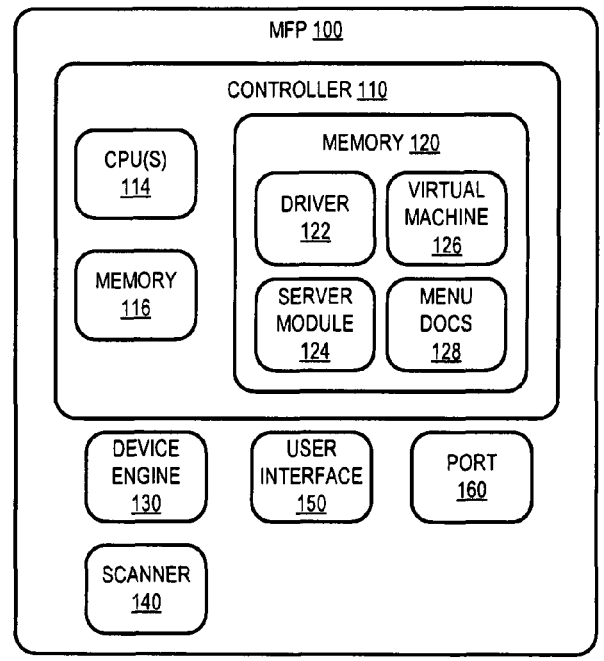
FIG. 2 illustrates components of a peripheral device.

Referring now also to FIG. 2, there is shown an embodiment 100 of MFP 30 of FIG. 1. MFP 100 includes a controller 110 operatively coupled to a device engine 130, scanning mechanism 140, user interface 150 and at least one port 160 suitable for communicatively coupling MFP 30 to a network (e.g., network 20, FIG. 1).

Controller 110 includes a processor 114 and memories 116, 120. Processor 114 may include one or more CPU's, for example. Memory 116 may be volatile in nature and include RAM memory. Memory 116 may be internal or external to processor 114. Memory 120 may be non-volatile in nature, and include magnetic or optical storage capability, ROM memory and/or flash memory, for example. Memory 120 includes device driver code 122 that is executed by processor 114. Memory 120 also includes server module 124, which is executed by processor 114 to serve menu documents 128 to the user interface 150.

According to an embodiment of the present invention, server module 124 is a local server in the sense that it is provided in the same MFP 100 as interface 150 and documents 128. Menu documents 128 are interpreted by the server module 124 and are configured to display textual and/or graphical information as menu pages on interface 150. Memory 120 also includes virtual machine 126. According to an embodiment of the present invention, server module 124 interacts with other computing devices via the network. Server 124 may take the form of an embedded web server application, for example.

Device engine 130 may take the form of hardware, software and/or firmware suitable for printing on a media substrate. Where laser printing technology is utilized, engine 130 may typically include an interface with controller 110, a drum unit, a fuser assembly, rollers and media sensors. Other media marking technologies, such as inkjet and/or impact printing, both by way of example only, may be used. Engine 130 operates responsively to processor 114 execution of driver code 122, such as to mark a media substrate, like paper or a transparency.

Interface 150 may take the form of a control panel, and include one or more user manipulated buttons and a display, such as an LCD display. Additionally, or in lieu thereof, interface 150 may incorporate a touch panel or touch screen display. Interface 150 may typically be used to configure the peripheral device (i.e., include a configuration control). Interface 150 is typically operable to display menu documents 128 to a user, responsively to such documents being served by module 124, and allow user selection of MFP operations presented thereby. For example, user options to configure MFP 100, and/or to print, scan and/or copy a document may be presented by documents 128 via interface 150 in a user selectable manner.

Scanner 140 is representative of any optical scanner technology that may be employed to produce scanned object data upon scanning an object. Such scanning technologies are well known. The resulting scanned object data is provided to processor 114 and/or stored in one or both of memories 116, 120. Scanner 140 may utilize at least a portion of engine 130, such as the rollers, sensors and/or interface. Alternatively, a separate media path for hard copies of media to be scanned may be provided by scanner 140, such that it also includes an interface, rollers and sensors, for example.

Scanner 140 may operate in conjunction with controller 110, interface 150 and engine 130 to provide the copy functionality of MFP 100. For example, scanner 140 may scan a hard copy of a document in a conventional manner, responsively to user selection of "copy" option via interface 150, and store data indicative thereof in memory 116 and/or 120. Driver code 122 may then operate engine 130 to print a representation or reproduction of the scanned document using the scanner 140 stored data indicative of the scanned document.

Port 160 may take the form of an interface for network 20. Port 160 may include a network adaptor and/or a network interface controller (NIC), for example. Port 160 may additionally include one or more communications interfaces for directly communicating with a computing device (i.e., independent of network 20), such as, by way of example, one or more serial, parallel, Bluetooth, IEEE 1394 and/or universal serial bus interfaces.

Port 160 may operate in conjunction with controller 110, engine 130 and interface 150 to provide the printing functionality of MFP 100. For example, interface 150 may be used to configure operating options or parameters of MFP 100. For example, a default media source (e.g., paper tray) may be user selected via interface 150 and/or MFP may be readied for printing (e.g., placed "on-line") via user interaction with interface 150. Data indicative of a document to be printed may be received by MFP 100 from network 20 via port 160. Responsively thereto, controller 110 may store this data in memory 116 and/or 120. Driver code 122 may then operate engine 130 to mark media using the received data indicative of the document to be printed.

Port 160 may operate in conjunction with controller 110, scanner 140 and interface 150 to provide the scanning functionality of MFP 100. For example, scanner 140 may scan a hard copy of a document in response to user selection of "scan" option via interface 150, and store data indicative thereof in memory 116 and/or 120. Driver code 122 may then operate in conjunction with port 160 to transmit the stored data indicative of the scanned document via network 20 to an intended recipient.

Virtual machine code 126 is executed by processor 114. Interface 150 keys or buttons allow an operator to select menu items that are displayed to the operator via documents 128. Menu documents 128 driving the menu pages may include embedded script code associated with the operator manipulated keys or buttons. Selecting a menu item by pressing a corresponding key or button of interface 150 may cause a virtual machine code 126 when executed by processor 114, to interpret and execute the script code associated with the operator selected key or button. The script code may be written in JavaScript code that is interpreted and executed on a Java Virtual Machine (JVM) 318, or any other suitable scripting language, such as VBScript or Perl, by way of example only.

Figure 3A:
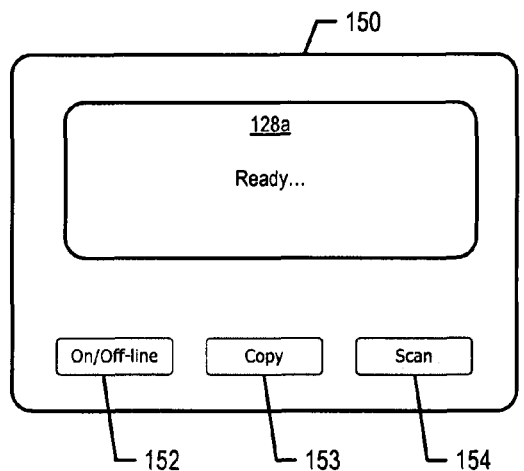
FIGS. 3a-3c illustrate user interfaces.
Figure 3B:
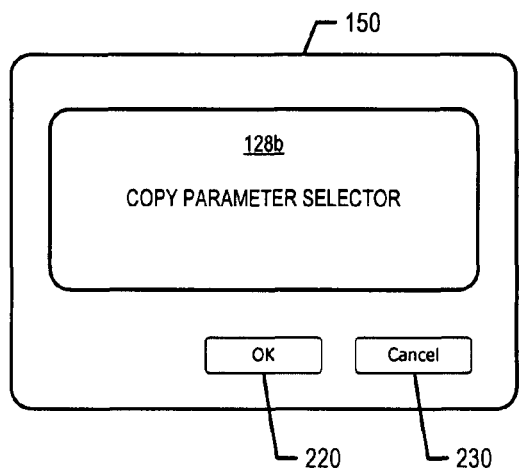
Figure 3C:
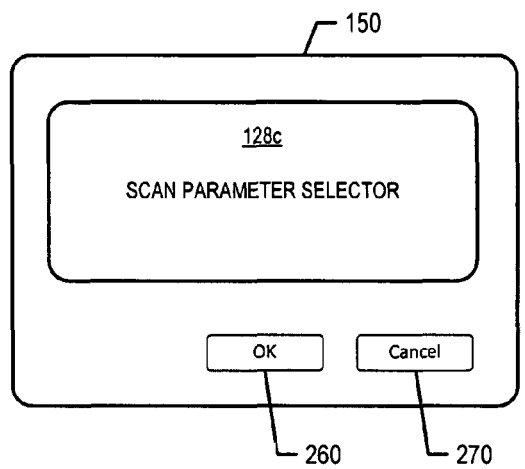

Referring now also to FIGS. 3a-3c, there are shown exemplary embodiments of menu documents 128 (FIG. 2) that may be presented to a user via interface 150. Menu document 128a (FIG. 3a) represents an exemplary configuration of interface 150 that may be presented to a user by server module 124 (FIG. 2) responsively to user selection of button 152 to ready MFP 100 for printing. Interface 150 of FIG. 3a further includes buttons 153, 154—that allow a user to operate the copy and scanning functionalities of MFP 100, respectively. Menu document 128b (FIG. 3b) represents an illustrative configuration of interface 150 that may be presented to a user by server module 124 (FIG. 2) responsively to user selection of button 153 to ready MFP 100 for copying. Document 128b and button 220 may be used to operate the copy functionality of MFP 100. Examples of parameters that may be entered using display 128b and button 220 include a number of copies to be made and other conventional copy settings, such as contrast and brightness, or color or monochrome, for example. Upon user selection of button 230, document 128a (FIG. 3a) may be presented via interface 150. Menu document 128c (FIG. 3c) represents an exemplary configuration of interface 150 that may be presented to a user by server module 124 (FIG. 2) responsively to user selection of button 154 (FIG. 3a) to ready MFP 100 for scanning. Document 128c and button 260 may be used to operate the scanning functionality of MFP 100. Examples of parameters that may be entered using menu 128c and button 260 include an intended recipient (e.g., an e-mail or network address) as well as additional scanning settings, such as contrast and brightness, color or monochrome, for example. Upon user selection of button 270, document 128a (FIG. 3a) again may be presented via interface 150. According to an embodiment of the present invention parameters presented via members 128b, 128c may be customized for individual users. For example, each user may be provided with different parameter choices. By way of further example, different users may be provided with different functionalities such that not all users may scan documents. By way of further example, different destination e-mail addresses may be presented to different users.

Referring again to FIG. 1, when MFP 30 is first connected to network 20, the MFP is in an "un-configured" state. Initial configuration of MFP 30 may be performed by a network administrator, such as by using Jet-Direct, which is commercially available from Hewlett-Packard, or NetPort, which is commercially available from IBM. MFP 30 may be assigned an address on network 20 (e.g., an IP address such as 192.168.1.250), where network 20 takes the form of a TCP/IP network, for example.

In certain configurations, a network port (e.g., a TCP/IP port) and device name is assigned to MFP 30 (e.g., by servers 50 and/or 60). Software for interfacing with MFP 30 (e.g., driver code) being operable by servers 50 and/or 60, and/or computing devices 40, 42, 44 is then loaded and configured (e.g., by servers 50, and/or 60 and/or computing devices 40, 42, 44). The availability of MFP 30 for operation is promulgated to servers 50 and/or 60, and/or computing devices 40, 42, 44, along with driver code (e.g., by servers 50 and/or 60).

Once initially configured, MFP 30 is ready for operation with devices 40, 42, 44 and servers 50 and/or 60. Such an initial configuration may generally enable MFP 30 to receive data indicative of documents to be printed from network 20 and transmit data indicative of scanned documents to intended recipients, either via a file transfer to one of devices 42, 44, 46, and/or servers 50, 60, for example, or by attaching the data indicative of scanned documents to an e-mail message addressed to the intended recipient and sending the e-mail message and data attachment to an appropriate mail server.

Figure 4:
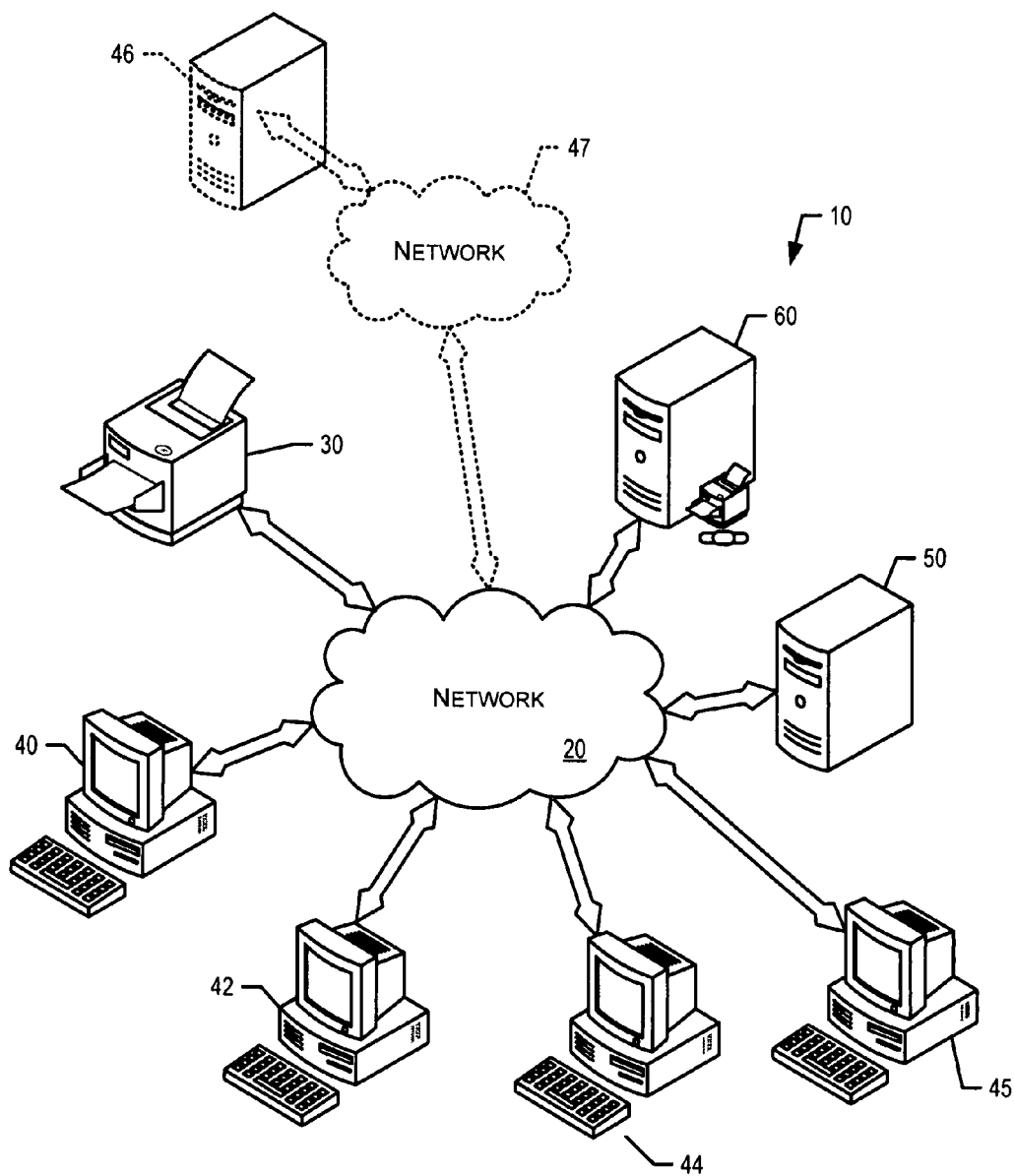
FIG. 4 illustrates a network including computing devices, a peripheral device and server devices.

Referring now to FIG. 4, there is shown a view of system 10, further including an additional device 45, associated with a new user. While the present invention will be described in connection with configuring a new device 45 and a new user, it is applicable to embodiments where an already existing device is being configured for a new user, and/or where a new device is being configured for an existing user, and/or to add functionality for an existing user and device where the initial configuration provided for only partial MFP 30 functionality (e.g., printing only), for at least one user. MFP 30 may be initially configured, as discussed above. Alternatively, initial configuration of MFP 30 may include the MFP being assigned an address utilizing a dynamic address allocation system, like DHCP, for example. Thereafter, MFP 30 may access network resources, such as by using a Lightweight Directory Access Protocol (LDAP) based approach. Such an approach may be used by processor 114 of MFP 30 to obtain directory information, such as e-mail addresses and encryption keys associated with network 20 users. By way of further example, mail exchange records (mx-records), entries in a domain name database that identifies the mail server that is responsible for handling e-mails for that domain name, may be accessed to recover user information.

Computing device 45 is configured to operate with network 20 in a conventional manner, e.g., it is joined to network 20. Thereafter, device 45 may be configured to operate with MFP 30. According to an embodiment of the present invention, this configuration may involve configuring device 45 to use multiple functionalities of MFP 30 and/or providing MFP 30 configuration information to device 45.

Figure 6:
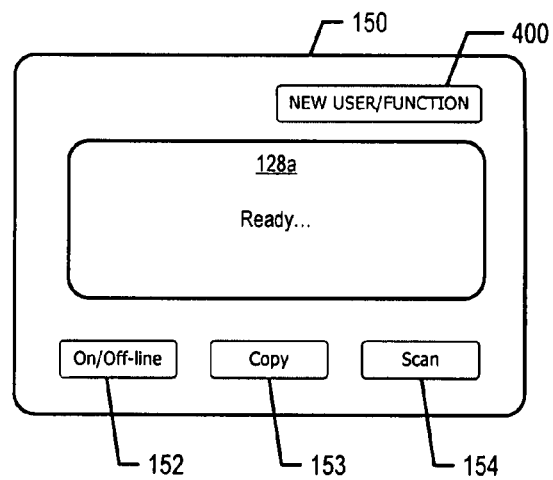
FIGS. 6 and 7 illustrate user interfaces suitable for use with the processes of FIGS. 5a and 5b.

Referring now to FIG. 5a, there is shown a flow diagram of a process 500 according to an embodiment of the present invention. Process 500 generally includes detecting a new user or new functionality button activation at block 505. Referring now also to FIG. 6, there is shown a configuration of interface 150 presenting menu document 128a (FIG. 3a) responsively to user selection of button 152 to ready MFP 100 for printing. The embodiment of FIG. 6 additionally includes a user operated control such as a configuration control button 400. Button 400 allows an operator to set-up or add a new user for MFP 100 and/or new functionality for a current user of MFP 100. According to an embodiment of the present invention, detecting button activation at block 505 may be responsive to operator activation of button 400.

Figure 7:
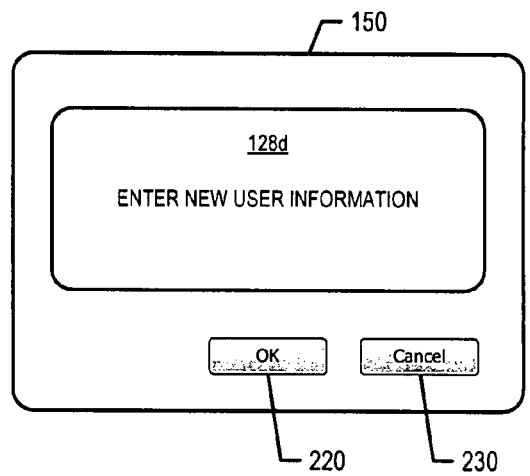

Referring now to FIG. 5a and FIG. 7, menu document 128d represents an illustrative configuration of interface 150 that may be presented to a user by server module 124 (FIG. 2) responsively to user selection of button 400 (block 505, FIG. 5a). Document 128d and button 420 may be used to enter information associated with the new user or functionality (block 510, FIG. 5a). According to an embodiment of the present invention, the entered user information may include a user name. Where new functionality for an existing user is being added, an existing user name may be selected from a list of existing users. According to an embodiment of the present invention, the entered user information may include a user e-mail address. According to an embodiment of the present invention, the entered user information may include a user facsimile number. The entered user information may include an identifier, such as a personal identifier number (PIN). At block 515 (FIG. 5a), the new user information that was entered is stored, such as in memories 116 and/or 120 (FIG. 2).

Figure 8:
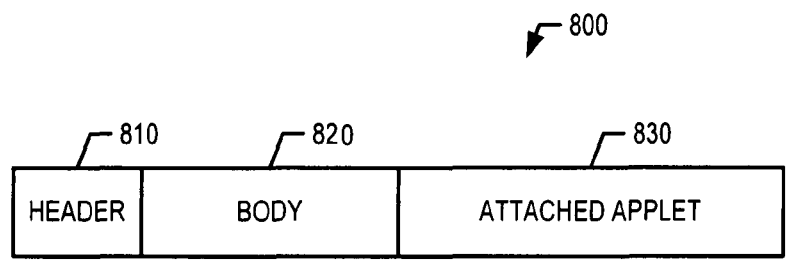
FIGS. 8 and 9 illustrate various views of an e-mail message suitable for use with the processes of FIGS. 5a and 5b.

Referring still to FIG. 5a, at block 520, an e-mail message associated with the user information entered and stored at blocks 510, 515 is constructed and sent by MFP 30; such as by processor 114 and port 160. Referring now also to FIG. 8, there is shown a block diagram of an e-mail message 800 that may be composed and sent at block 520 (FIG. 5a). Message 800 generally includes a header portion 810, a body portion 820 and an attachment portion 830. Attachment portion 830 may be embodied as a separate e-mail message, and/or omitted. Header portion 810 generally includes data indicative of MFP 30 and the user e-mail address entered and stored at blocks 510, 515. Header portion 810 may also include data indicative of the subject of the e-mail message 800 and/or a date and time e-mail message 800 is composed and/or sent. Body portion 820 may include user instructions or other information associated with MFP 30. Attachment portion 830 may include device 45 executable code, e.g., an applet. The applet may include script code, such as JavaScript code that is interpreted and executed using a Java Virtual Machine (JVM) operated by device 45, or any other suitable scripting language, such as VBScript or Perl, by way of example only. Alternatively, or in addition thereto, a list of instructions to be followed may be output, such as by printing.

Once composed, e-mail message 800 may be sent to the user e-mail address entered and stored at blocks 510, 520 in a conventional manner, e.g., such as by processor 114 via port 160 to a mail server incorporated in server 50 (FIG. 4).

Figure 9:
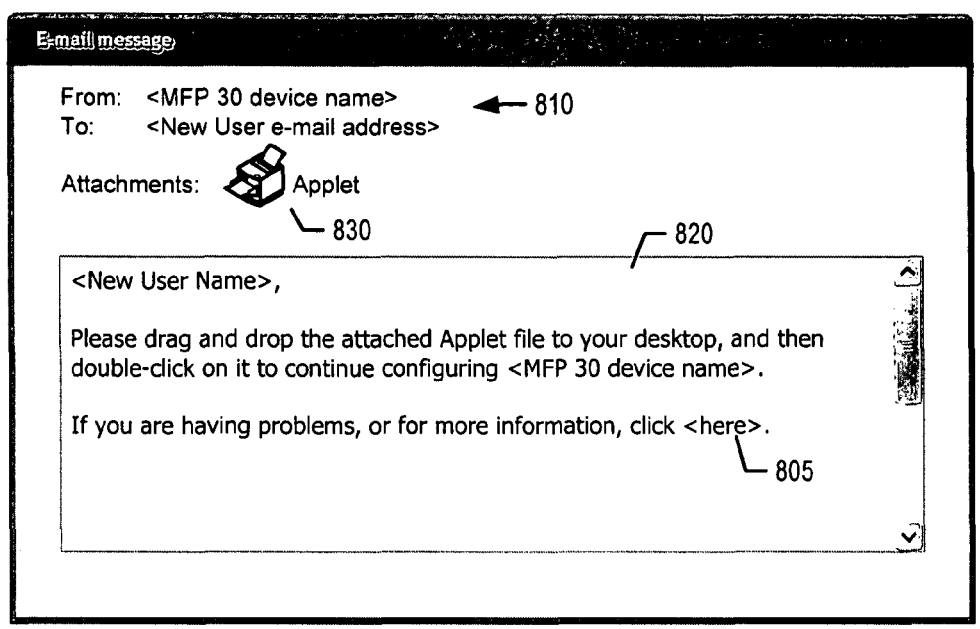

Referring now also to FIG. 5b, there is shown a flow diagram of a process 540 according to an embodiment of the present invention. Process 540 is well suited for use with process 500. Process 540 begins with e-mail 800 being received at device 45 at block 550. E-mail 800 may be retrieved from a mail server and processed by device 45 using a conventional e-mail application, such as Outlook, which is commercially available from Microsoft. Referring now also to FIG. 9, there is shown a view of e-mail 800 after being received and opened at device 45. In the illustrated embodiment, e-mail message 800 includes a message header portion 810, a body portion 820 and attachment portion 830. As can be seen in the embodiment of FIG. 9, body portion 820 of message 800 includes instructions that instruct the operator to copy the attached applet to device 45 by dragging it to and dropping it on the device 45 operating system desktop, and then to execute it, by double-clicking. At block 560 (FIG. 5b), the applet is executed, such as by a Java Virtual Machine (JVM) running at device 45, responsively to the user following the instructions in body 810 of e-mail 800.

According to an embodiment of the present invention, the device 45 executing applet (hereinafter referred to as the "applet") may assist the user to configure device 45 to operate with MFP 30. According to an embodiment of the present invention, the applet may instantiate a web browser application included at device 45, such as Internet Explorer by Microsoft, and cause that browser to access a configuration menu page, or series of configuration menu pages stored at MFP 30 (e.g., surf to MFP 30 at it's network 20 location). It is generally known to include one or more configuration menu pages that can be accessed via a remote web browser across a network at a network peripheral, such as a network router or MFP. Advantageously however, a user need not have a detailed understanding of network 20, and/or know the address of MFP 30 on network 20 to access such a configuration menu page according to an embodiment of the present invention. Instead, as the applet was provided by MFP 30, it may include such information for use at device 45.

The applet may change one or more device 45 configuration settings, and/or advise a user as to appropriate steps to change one or more device 45 configuration settings. For example, MFP 30 may be configured to store data indicative of scanned documents at a given storage location accessible via network 20, such as in a particular directory on each computing device 40, 42, 44, 45. In such an embodiment, a user may opt to scan a document, and by selecting himself as the intended recipient or scan destination, cause MFP 30 to store data indicative of the scanned document in a predetermined directory on a local disk drive in a device associated with his user account via a network 20 address associated with the user at MFP 30 (e.g., in a sub-directory of an internal disc drive of computing device 45).

Figure 10:
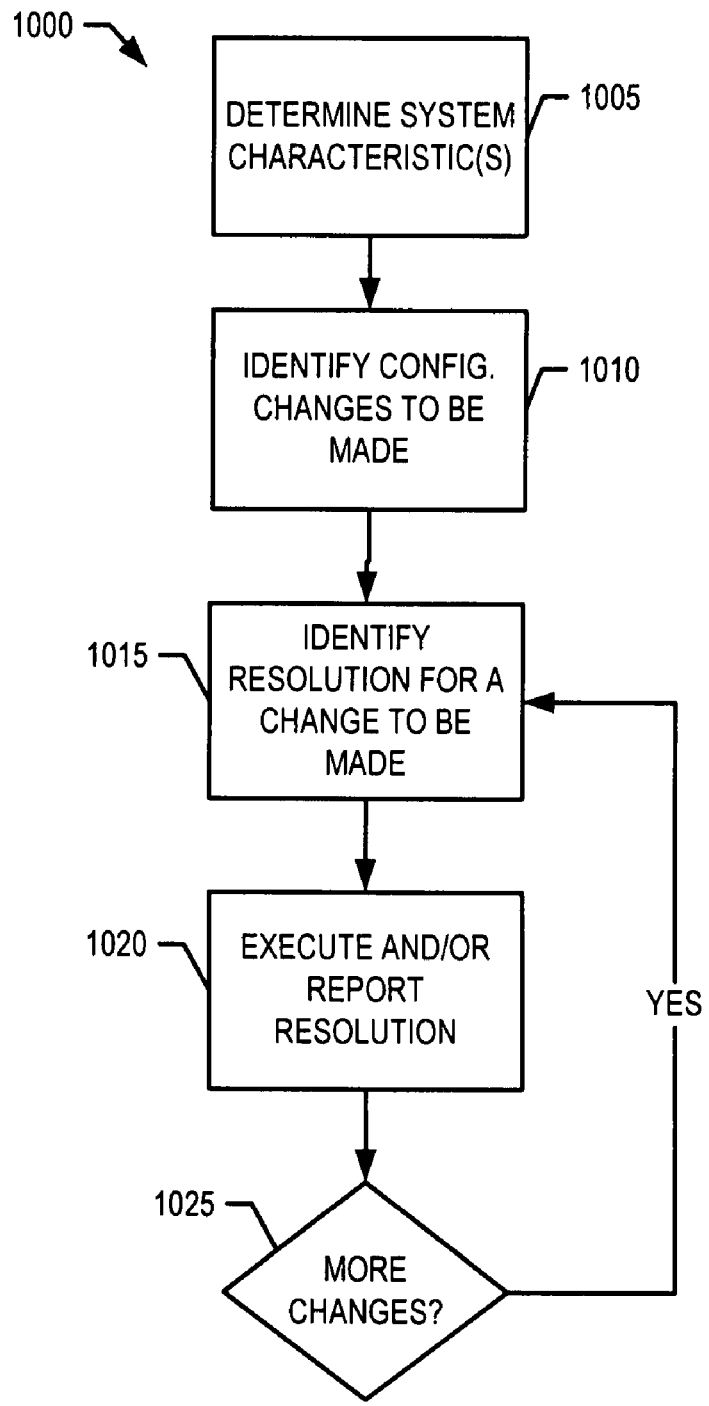
FIG. 10 illustrates a process according to an embodiment of the present invention.

One problem sometimes encountered with configuring such a functionality, is that MFP 30 needs permission to store data in the predetermined directory (e.g., the subdirectory of the internal disc drive of the computing device 45 needs to be shared with MFP 30). Such a configuration change may require a multi-step resolution, dependent upon characteristics of the device 45 and user preferences (e.g., dependent upon what subdirectory is to be used, and what operating system device 45 is using). Referring now to FIG. 10, there is shown a process 1000 for changing one or more device 45 configuration settings, and more particularly for sharing a predetermined directory with MFP 30, according to an embodiment of the present invention.

Process 1000 begins with determining system 45 characteristics at block 1005. Interrogations that return characteristics of a device, such as processor, memory, storage capacity and/or operating system specifics, are generally known. Such inquiries may include user provided answers and electronic interrogations of the device itself. Any suitable manner may be used. In the discussed example, relevant inquiries may include: (1) what operating system is the device using? (which may be presented to the device by an interrogation function); (2) what directory does the user want to store scans in? (which may be presented to the user of device 45 for an answer); and, is the selected directory accessible for data storing by MFP 30 (which may be presented to the device as an interrogation function). According to an embodiment of the present invention, device and/or user authorization and/or authentication may be required to access and/or store information. For example, an administrator password may be required to interrogate and/or subsequently configure system 45.

Upon determining the relevant characteristics, process 1000 may determine if any configuration changes of device 45 should be made at block 1010. For purposes of explanation, it is assumed that the target directory for scanning is not shared with MFP 30. In such a case, the process 1000 implementing applet may next identify a resolution for the configuration change to be made at block 1015, e.g., an appropriate process for changing the device 45 configuration. This may be accomplished by querying a database server, such as a database server incorporated at server 50, to determine a sequence of steps suitable for making the subject configuration change; e.g., to share the user selected subdirectory with MFP 30. Alternatively, the database may be incorporated at any server accessible to the process 1000 executing applet, such as a server accessible via the Internet.

Once a resolution has been identified at block 1015, a user may be prompted in a step-by-step manner to make the configuration change to device 45 at block 1020, e.g., to perform a sequence of steps that will share the desired target directory with MFP 30. Alternatively, or in addition thereto, where the resolution may be accomplished automatically, such as by the process 1000 implementing applet, code for causing the steps to be accomplished directly by device 45 may be executed by the device 45 at block 1020. Device 45 configuration information may be communicated to and stored by MFP 30, such as the desired target scanning directory, to continue configuring MFP 30.

At block 1025, process 1000 may determine if another configuration parameter of device 45 is to be changed. If so, processing returns to block 1015. Other changes that may be made include installing applications that operate in conjunction with MFP 30 on device 45, such as utilities and/or optical character recognition applications, and/or driver(s) that correspond to MFP 30 and the configuration of device 45, for example.

Referring again to FIG. 4, data to be accessed and/or used by the applet may, but need not be, included with the applet itself. For example, e-mail 800 may be comprehensive in nature, such that data used in its operation is included with it. Alternatively, or in addition to some data, the applet may access data, or other applets, stored in a manner so as to be accessible thereto. For example, the applet included in e-mail 800 may call other applets that perform desired functions, and that are stored at one or more resources in network 20, e.g., at server 50 and/or 60, or MFP 30 itself. The utilized data or called applets may be stored on a resource in another network, such as a server 46 accessible by the applet via a combination of networks 20 and 47.

Referring again to FIG. 9, additional resources to assist a user to configure device 45 and MFP 30 may also be stored at one or more resources in network 20, e.g., at server 50 or MFP 30 itself. Such additional information may be stored on a resource in another network, such as server 46 accessible by the applet via a combination of networks 20 and 47. This additional information may be accessed by providing a link that may be accessed with a web browser, such as link 805, which will cause one or more web pages or applets to load from the target resource. The additional information may take the form of troubleshooting utilities and/or documents having answers to frequently asked questions (FAQs).

Referring now to FIG. 11a, there is shown a flow diagram of a process 1100 according to an embodiment of the present invention. Process 1100 generally includes detecting a new user or functionality button activation at block 505, akin to block 505 of FIG. 5a. At block 510, new user information is entered, as is also discussed herein-above. At block 1110 setup instructions are output to a user. Block 1110 may include printing a hard copy of setup instructions using MFP 30 itself, and/or faxing a copy of the setup instructions to a phone number entered by the operator at block 510, and/or sending an electronic document, such as an e-mail to an address entered by the operator at block 510.

Referring now also to FIG. 12, there is shown an exemplary page 1200 of setup instructions that may be output at block 1110 according to an embodiment of the present invention. As can be seen therein, the setup instructions prompt an operator to access a website page via the address www.URL.com/setup, download configuration software and execute the configuration software. According to an embodiment of the present invention, the configuration software may take the form of and/or incorporate applet 830 (FIG. 8). According to an embodiment of the present invention, the setup instructions may further include information indicative of MFP 30 that may be used with the applet to help an operator configure a computing device to operate there-with. In the exemplary embodiment of FIG. 12, the setup instructions include an MFP 30 identifier in the form of a serial number and a network address associated with MFP 30, e.g., a network 20 (FIG. 4) address. According to an embodiment of the present invention, this information may be entered by an operator into the configuration software, to facilitate downloading proper applications and/or drivers for use with MFP 30 and the computing device being configured, e.g., device 45.

Referring now also to FIG. 11b, there is shown a flow diagram of a process 1120 according to an embodiment of the present invention. Process 1120 is well suited for use in combination with process 1100 of FIG. 11a. Process 1120 commences with downloading the applet at block 1130, such as responsively to an operator following the setup instructions outputted at block 1110. The applet is then executed at block 560, analogously as has been described in connection with FIG. 5b.

Figure 13:
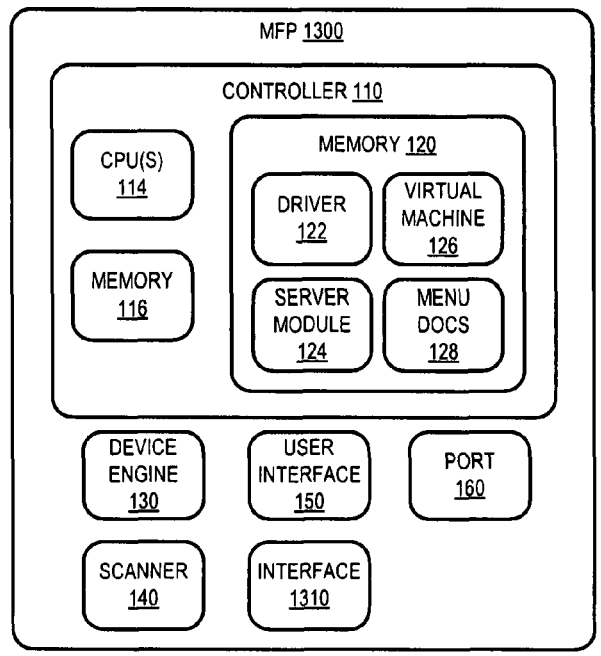
FIG. 13 illustrates components of a peripheral device.

Referring now to FIG. 13, there is shown an embodiment 1300 of MFP 30 (FIGS. 1 and 4). Embodiment 1300 is akin to embodiment 100, and additionally includes interface 1310. Interface 1310 may take the form of an interface suitable for communicating with a removable memory device. Interface 1300 may take the form of a memory card interface, such as a flash memory card (e.g., compact flash card) interface, or a USB interface for receiving a flash memory device, for example.

Figure 14A:
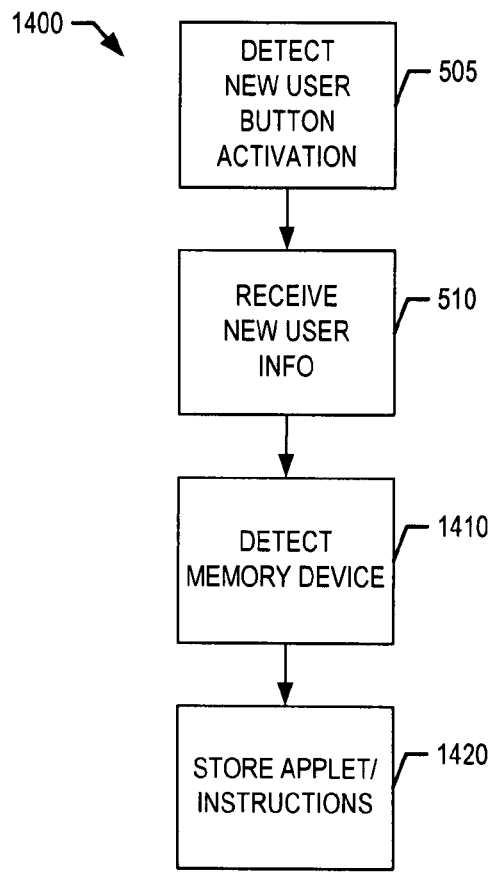
FIGS. 14a and 14b illustrate processes according to an embodiment of the present invention.

Referring now also to FIG. 14a, there is shown a flow diagram of a process 1400 according to an embodiment of the present invention. Process 1400 is well suited for use where MFP 30 takes the form of embodiment 1300. Process 1400 generally includes detecting a new user or functionality button activation at block 505, akin to block 505 of FIG. 5a. At block 510, user information is entered, as is discussed herein-above. At block 1410, a removable memory device being coupled with interface 1310 is detected. MFP 30 may detect that a flash memory card was inserted into interface 1310 in a conventional manner. At block 1420, an applet and/or software instructions analogous to those discussed herein-above are stored on the removable memory device.

Figure 14B:
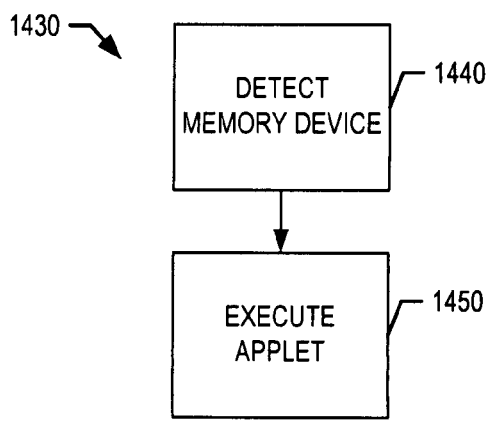

Referring now also to FIG. 14b, there is shown a flow diagram of a process 1430 according to an embodiment of the present invention. Process 1430 is well suited for use in conjunction with process 1400 (FIG. 14a). Process 1430 commences with detecting that the removable memory device loaded in process 1400 has been coupled to a computing device at block 1440. For example, device 45 may detect that the flash memory card was inserted into an interface thereof in a conventional manner. At block 1450, the applet stored at block 1420 may be executed, e.g., by device 45 as has been discussed herein-above. At block 1450, instructions stored at block 4120 may be accessed, e.g., by an operator of device 45.

According to an embodiment of the present invention, authentication and/or authorization codes may be stored on the memory device and later accessed to facilitate authentication and/or authorization of users and/or devices. For example, an administrator password may be required to configure a device.

According to an embodiment of the present invention part of the user information entered at block 510 (FIGS. 5a, 11a, 14a) may include a personal identifier, such as a personal identification number (PIN), by way of example only. Alternatively, such an identifier may be entered during configuration of the user's device (e.g., device 45, FIG. 4) responsively to prompting by an executing applet (e.g., applet 830). Where such an identifier is provided, a user may be prompted to re-enter the PIN to confirm his identity. Such a confirmation may be required to configure MFP 30 (FIGS. 1, 4), and/or utilize certain MFP 30 functionality.

Figure 15A:
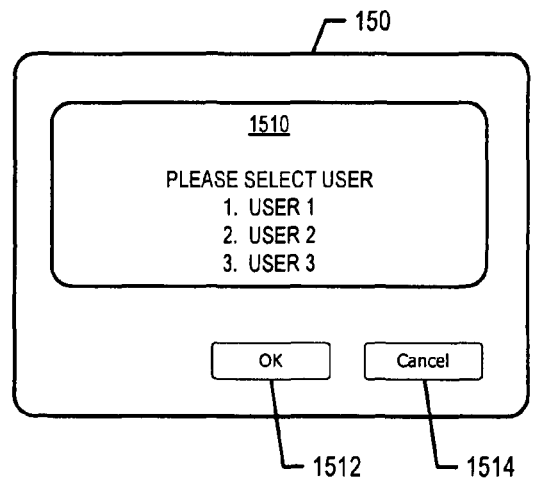
FIGS. 15a and 15b illustrate user interfaces according to an embodiment of the present invention.

Referring now to FIG. 15a, there is shown an illustrative configuration of interface 150 that may be presented to a user by server module 124 (FIG. 2) responsively to user selection of button 154 (FIG. 3a) to ready MFP 100 for scanning where an identifier was entered for a configured user of MFP 30. Menu document 1510 (that may be included within menu pages 128, FIG. 2) prompts an MFP operator to identify himself as being one of the configured users. Upon selection of one of the users, and activation of button 1512, the illustrative configuration of interface 150 shown in FIG. 15b may be presented to the operator. The illustrative configuration of interface 150 shown in FIG. 3a may be presented to the operator responsively to operator activation of button 1514.

Figure 15B:
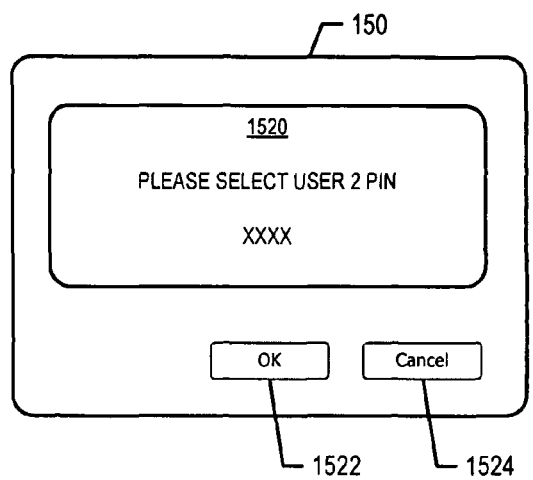

Referring now to FIG. 15b, menu document 1520 (that may be included within menu pages 128, FIG. 2), prompts the MFP 30 operator to enter the PIN that corresponds to the user selected using menu page 1510. Upon entering the correct PIN, and activating button 1522, the illustrative configuration of interface 150 shown in FIG. 3c may be presented to the operator. If an incorrect PIN is entered, the illustrative configuration of interface 150 shown in FIG. 15a may be presented to the operator. If button 1524 is activated, the illustrative configuration of interface 150 shown in FIG. 15a may be presented to the operator.

By way of further example, where MFP 30 stores predefined lists of e-mail addresses and/or facsimile numbers of intended recipients of scanned and/or printed documents for users, such an approach may restrict other users' ability to improperly utilize these addresses and/or facsimile numbers.

In such a manner, users may be restricted from undertaking activities associated with other users, such as for example storing data indicative of a scanned document in a subdirectory in the internal memory of another user's computing device and/or faxing or e-mailing a document while posing as another user.

Such an identifier may also be utilized to confirm that the intended user is configuring his computing device to operate with the intended peripheral device. For example, the applet (e.g., applet 830, FIGS. 8, 9) may request the user to enter a same PIN as was previously entered at the MFP. If the PINs match, the applet may proceed. If the PINs don't match, applet execution may halt.

According to an embodiment of the present invention, public/private key cryptography may be used in a similar manner to authenticate and/or restrict access to configuration and operating messages between a user's computing device and an MFP.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A process for configuring a computing device to operate with a peripheral device having a configuration control and that is coupled to the computing device via a network, comprising:
    detecting activation of the configuration control at the peripheral device; receiving information associated with a user of the computing device at the peripheral device;
    outputting information from the peripheral device dependent on the received information; and
    configuring the computing device to operate with the peripheral device using the outputted information to achieve a given functionality of the peripheral device, by:
        determining that a configuration change of the computing device has to occur for the given functionality of the peripheral device to be achieved;
        identifying a resolution to effect the configuration change of the computing device by querying a database server to determine a sequence of steps adapted to realize the configuration change of the computing device in order to achieve the given functionality of the peripheral device; and
        implementing the resolution by performing the sequence of steps at the computing device to realize the configuration change of the computing device in order to achieve the given functionality of the peripheral device, such that effecting the configuration change of the computing device by performing the sequence of steps of the resolution permits the given functionality of the peripheral device to be achieved.

2. The process of claim 1, wherein:
    the step of receiving information comprises receiving an electronic mail address; and the step of outputting comprises sending an electronic mail message to the received electronic mail address.

3. The process of claim 2, wherein the sent electronic mail message comprises executable code.

4. The process of claim 3, further comprising executing the executable code using the computing device.

5. The process of claim 4, wherein the executed code interrogates the executing computing device.

6. The process of claim 4, wherein the executed code at least partially configures the executing computing device.

7. The process of claim 4, wherein the executed code prompts a user to configure the executing computing device.

8. The process of claim 7, wherein the prompting comprises providing a sequence of user actions.

9. The process of claim 1, wherein the step of outputting comprises printing a series of instructions.

10. The process of claim 1, wherein the peripheral device is a printer.

11. The process of claim 1, further comprising storing the outputted information on a removable memory device.

12. The process of claim 1, wherein said configuring comprises adjusting at least one from a set of operating options and parameters of said computing device.

13. The process of claim 1, wherein the received information comprises a personal identifier of the user.

14. The process of claim 13, further comprising receiving the personal identifier at the computing device.

15. A peripheral device being suitable for use with a plurality of computing devices via a network, comprising:
    a processor;
    a memory operatively coupled to the processor and storing processor executable code for:
        detecting activation of a configuration control at the peripheral device; receiving information associated with a user of a computing device at the peripheral device; and
        outputting information from the peripheral device associated with the peripheral device and dependent on the received information for configuring the computing device to operate with the peripheral device to achieve a given functionality of the peripheral device, where configuring the computing devices comprises:

determining that a configuration change of the computing devices has to occur for the given functionality of the peripheral device to be achieved;

identifying a resolution to effect the configuration change of the computing devices by querying a database server to determine a sequence of steps adapted to realize the configuration change of the computing devices in order to achieve the given functionality of the peripheral device; and implementing the resolution by performing the sequence of steps at the computing device to realize the configuration change of the computing devices in order to achieve the given functionality of the peripheral device, such that effecting the configuration change of the computing devices by performing the sequence of steps of the resolution permits the given functionality of the peripheral device to be achieved.

16. The device of claim 15, wherein:
the received information comprises an electronic mail address; and
the outputting information comprises sending an electronic mail message to the received electronic mail address.

17. The device of claim 15, wherein the sent electronic mail message comprises executable code suitable for use with at least one of the computing devices.

18. The device of claim 15, further comprising an engine being coupled to the processor and operative for marking substrates responsively to the computing devices.

19. The device of claim 15, further comprising a scanner coupled to the processor and for operative generating data indicative of scanned documents.

20. The device of claim 15, wherein the device is a multi-function printer/scanner/copier device.

21. A multi-functional peripheral device, comprising:
communications means for coupling the device to a network computing device; a user-operable configuration control;
means responsive to operation of the configuration control for requesting user information;
processor means responsive to receiving said requested user information for generating configuration data dependent on the received information to configure the network computing device;
output means for outputting said configuration data from said peripheral device for configuring the network computing device to operate with the peripheral device to achieve a given functionality of the peripheral device, where configuring the network computing device comprises:

determining that a configuration change of the network computing device has to occur for the given functionality of the peripheral device to be achieved;

identifying a resolution to effect the configuration change of the network computing device by querying a database server to determine a sequence of steps suitable adapted to realize the configuration change of the network computing device in order to achieve the given functionality of the peripheral device; and applying the resolution by performing the sequence of steps at the network computing device to realize the configuration change of the the network computing device in order to achieve the given functionality of the peripheral device, such that effecting the configuration change of the network computing device by performing the sequence of steps of the resolution permits the given functionality of the peripheral device to be achieved.

22. The multi-functional peripheral device of claim 21, wherein said user-operable configuration control comprises a new user selector.

23. The multi-functional peripheral device of claim 21, wherein the user information comprises an electronic mail address.

24. The multi-functional peripheral device of claim 23, wherein the user information further comprises a personal identification number.

25. The multi-functional peripheral device of claim 23, wherein the configuration data is included in an electronic mail message output to said electronic mail address via said output means.

26. The multi-functional peripheral device of claim 21, wherein said configuration data includes computer executable code.

* * * * *

UNITED STATES PATENT AND TRADEMARK OFFICE
CERTIFICATE OF CORRECTION

| | | |
|---|---|---|
| PATENT NO. | : 7,730,241 B2 | Page 1 of 1 |
| APPLICATION NO. | : 11/788656 | |
| DATED | : June 1, 2010 | |
| INVENTOR(S) | : Steven G. Henry et al. | |

It is certified that error appears in the above-identified patent and that said Letters Patent is hereby corrected as shown below:

In column 14, line 19, in Claim 21, after "of the" delete "the".

Signed and Sealed this

Twelfth Day of October, 2010

David J. Kappos
*Director of the United States Patent and Trademark Office*